(12) United States Patent
Shum

(10) Patent No.: US 6,710,577 B1
(45) Date of Patent: Mar. 23, 2004

(54) BATTERY CHARGER

(75) Inventor: King Mo Shum, Hong Kong (HK)

(73) Assignee: Jeckson Electric Company Limited (HK)

( * ) Notice: Subject to any disclaimer, the term of this patent is extended or adjusted under 35 U.S.C. 154(b) by 6 days.

(21) Appl. No.: 10/430,028

(22) Filed: May 6, 2003

(51) Int. Cl.⁷ .............................................. H01M 10/46
(52) U.S. Cl. ...................................................... 320/112
(58) Field of Search ................................ 320/107, 112, 320/114, 115, 116, 110, 150

(56) References Cited

U.S. PATENT DOCUMENTS

| | | | | |
|---|---|---|---|---|
| 5,977,746 A | * | 11/1999 | Hershberger et al. | 320/112 |
| 6,018,227 A | * | 1/2000 | Kumar et al. | 320/106 |
| 6,023,146 A | * | 2/2000 | Casale et al. | 320/112 |
| 6,137,260 A | * | 10/2000 | Wung et al. | 320/116 |

* cited by examiner

*Primary Examiner*—Edward H. Tso
(74) *Attorney, Agent, or Firm*—Kaplan & Gilman, LLP

(57) ABSTRACT

A battery charger for simultaneously charging a plurality of rechargeable batteries for example of AA or AAA size. The invention allows such batteries to be fully charged in up to about half the time previously considered to be possible without damaging or destroying the batteries. It has been found that by mounting the batteries on the base of a charger such that they are substantially exposed and spaced apart, an average charging current of up to about twice that previously considered to be possible can be applied without overheating the batteries.

13 Claims, 4 Drawing Sheets

BATTERY CHARGER

BACKGROUND

The present invention relates to a charger for simultaneously charging a plurality of rechargeable batteries.

Many portable electronic products use rechargeable batteries as their energy source. Examples of such batteries are of the AA or AAA size, for example of the Nickel Metal Hydride (NiMH) type. In charging a rechargeable battery, electrical energy, that is an electrical current is passed through the battery in a reverse direction to the discharge current direction and is converted into chemical energy internally of the battery, which process is accompanied by generation of heat energy causing a rise in the temperature of the battery being charged, both internally and on its surface. As the battery becomes more fully charged, the internal chemical reaction slows and more of the electrical energy input is converted into heat energy. This continues until, at full charge, the chemical reaction effectively ceases and virtually all of the electrical energy input is converted into heat energy, which stage is manifested by a significant increase in the surface temperature of the battery. This heat generation during charging limits the rate at which a battery can be charged and thus the time taken to fully charge a battery. An International Electrotechnical Commission (IEC) "standard charging current" for rechargeable batteries specifies a charging current of 0.1 $I_t$ (where $I_t$ is the reference test current specified in IEC International Standard 61436) that will take a long time, for example 16 hours, to fully charge a rechargeable battery and thus avoids problems associated with heat generation during the charging process. Consumers in today's world, however, are seeking to have their electronic products and thus the batteries that energise them available for the maximum amount of time possible and are thus requiring shorter and shorter charging times for their rechargeable batteries. Shorter charging times are achievable by increasing the charging current. However the greater the increase in the charging current, the greater is the heat generation problem, which can be so great as to destroy a battery.

In a current charger for AA and AAA sized batteries, a minimum charging time of approximately one hour is possible. Generally, charging times that are shorter than this carry a high risk of causing damage to or destroying the battery concerned because of the heat generated by the increased charging current necessitated by the shorter charging time. This problem is worsened in a charger for simultaneously charging a plurality of batteries, for example four batteries, because there is greater heat generation from the plurality of batteries than from one battery due to a localisation of the batteries to meet size and cost limitations for the charger for consumer acceptance.

An object of the present invention is to provide a charger of consumer acceptable size and cost for simultaneously charging a plurality, for example four, rechargeable batteries that allows a significantly increased charging rate and thereby much shorter charging time than is generally currently achievable for chargers of comparable size and cost.

SUMMARY OF THE INVENTION

The present invention provides a charger for simultaneously charging a plurality of rechargeable batteries, each battery having a nominal charging current as determined by its capacity rating in milliamp hours at one hour, the charger comprising a base, a charging circuit contained within the base and connectable to a power supply, the base including means for individually mounting thereon a plurality of re-chargeable batteries, the mounting means for each battery including contacts connected to the charging circuit for contacting the terminals of the battery for passage of a charging current through the battery, wherein the mounting means for each battery are located relative to the base and to each other such that a plurality of batteries mounted on the base are substantially exposed and spaced apart whereby the plurality of batteries are chargeable without over-heating with an average charging current of up to about twice their nominal charging current.

It has been discovered that within consumer acceptance constraints of size and cost for a charger, a plurality of rechargeable batteries can simultaneously tolerate a charging current of about twice that which is commonly considered to be maximally appropriate for a fast charge via an equivalently sized charger, provided the plurality of batteries can be adequately cooled. It has furthermore been discovered that such adequate cooling can be achieved without significantly changing the physical size of a charger compared to a said equivalently sized charger or unacceptably increasing the cost such as by the addition of a cooling fan accessory. This cooling is achievable when the batteries are individually substantially exposed to ambient cooling air and are substantially spaced apart, that is, when they are maximally spaced apart according to the dictates of the shape of the base. For example, for a base that is of rectangular parallelepiped shape of substantially 120×80×34 mm, four batteries for simultaneously charging can each be aligned along a top edge of the base instead of lying parallel to each other across a top surface as in prior art chargers. Recesses, each opening to a top and adjacent side surface of the base, can be provided at each top edge for accommodating the batteries and ensuring exposure of each battery at the top and adjacent side surfaces for cooling via ambient air flow. Additionally each recess may be provided with a slot extending from a bottom surface of the slot and opening to a bottom surface of the base, thereby further exposing a battery in the recess to cooling ambient air flow. For a base of generally cylindrical or frustoconical shape for example, four batteries for simultaneous charging can be held in an upright orientation and spaced equally around the outer curved surface of the base. This arrangement also facilitates the use of mounting means for the batteries, for example brackets or clips, for holding the batteries off the curved outer surface, that is for spacing the batteries from the curved outer surface by a small amount for further exposure of the batteries for cooling.

Preferably the batteries are chargeable with an average charging current greater than 1.0 $I_t$ and up to about 2.0 $I_t$, where It is the reference test current defined in paragraph 2 of IEC Standard 61434:1996, that is:

$$I_t A = \frac{C_n A h}{1 h}$$

where $I_t$ is the reference test current, in amperes (A);

$C_n$ is the rated capacity of the cell or battery as declared by the manufacturer, in ampere-hours (Ah);

n is the time base (hours) for which the rated capacity is declared.

According to the invention, the charging current may vary in a predetermined manner during the charging process. For example, the charger may charge at 4.0 $I_t$ for 10 minutes and then at 1.0 $I_t$ for 20 minutes.

For a better understanding of the invention and to show how it may be carried into effect, preferred embodiments thereof will now be described by way of non-limiting example only with reference to the accompanying drawings.

DETAILED DESCRIPTION OF EMBODIMENTS

Figure 1:
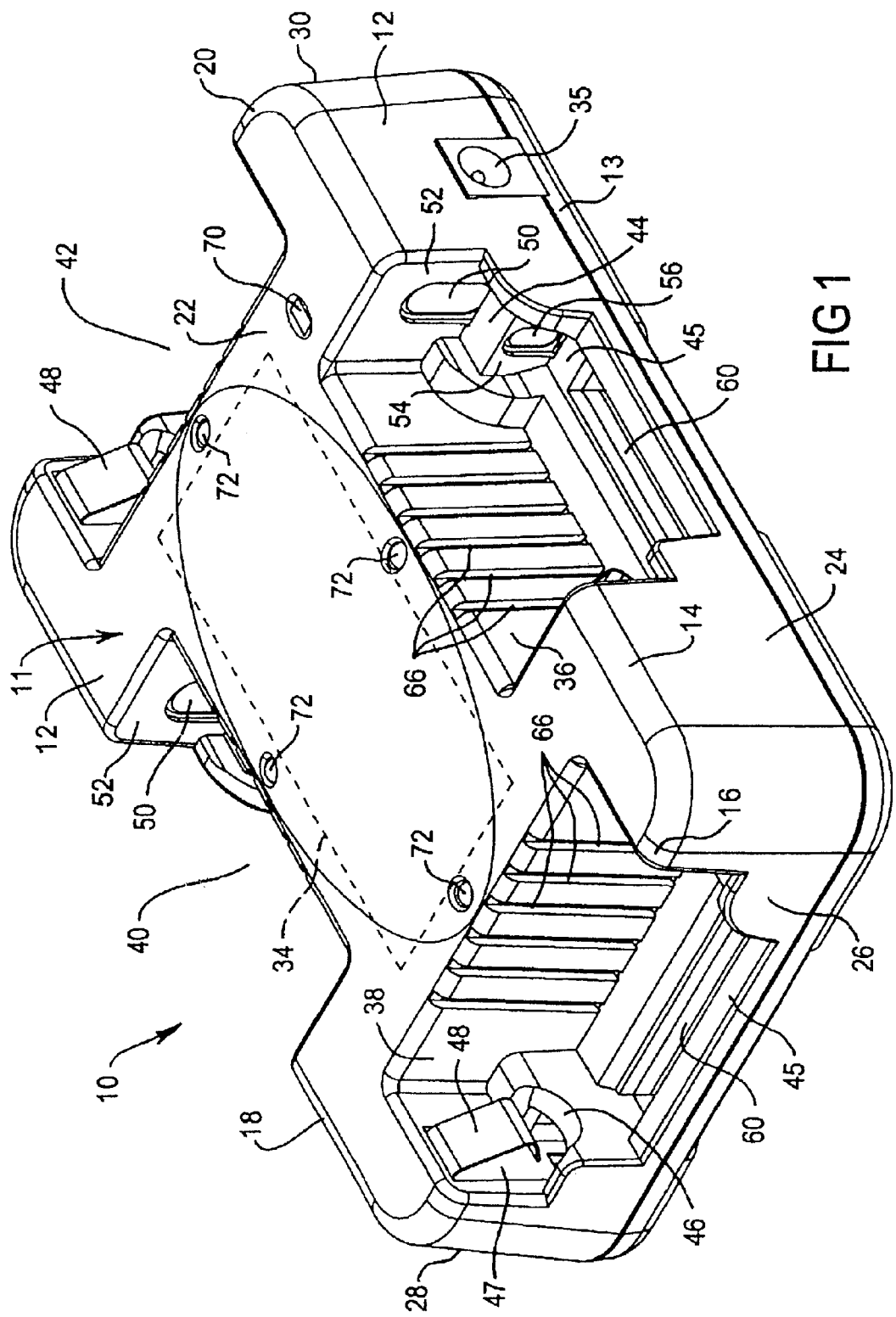
FIG. 1 is an isometric view of a battery charger according to a first embodiment of the invention.

A battery charger 10 according to a first embodiment of the invention (see FIGS. 1 to 3) comprises a base 11 which is of rectangular parallelepiped shape. An ideal size for the base is 120×80×34 mm. The base 11 is a two-part casing formed by a top part 12 and a bottom plate 13 held together by appropriate screws, as is known (holes 15 for such screws can be seen in FIG. 3). The top part 12 and bottom plate 13 may be formed by moulding a suitable plastics material such as ABS (Acrylonitrile Butadiene Styrene). The top part 12 of base 11 has four rounded upper edges 14, 16, 18, 20. The upper edges 14–20 are defined by the rounded transitions between a top surface 22 of the base 11 and, respectively, four side surfaces 24, 26, 28, 30 of the base 11. The base 11 also has a bottom surface 32, that is, the lower facing surface of bottom plate 13—see FIG. 3. A charging circuit, schematically indicated by (but not necessarily bound by) dotted outline 34 in FIG. 1, is included within the base 11 and is connectable to a suitable power supply either built-in or via a socket 35. As is known, a suitable power supply may be provided from a mains power supply via a power cord having a combined plug/transformer for connection to the mains at one end and a low voltage plug at the other end for connection to socket 35.

Figure 2:
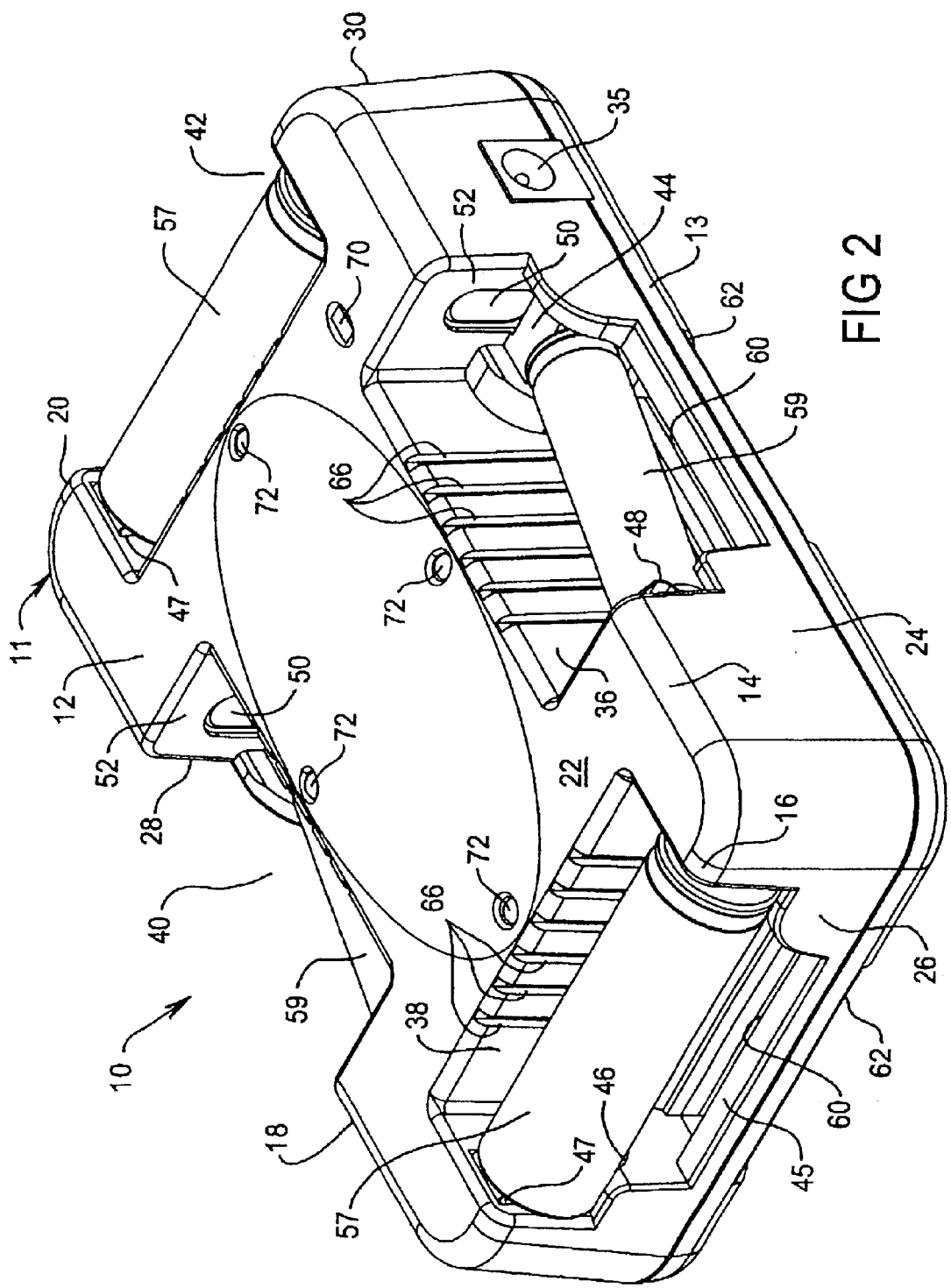
FIG. 2 is a view similar to that of FIG. 1 showing batteries accommodated within the charger for charging.

The base. 11 includes means for individually mounting on the base 11 four rechargeable batteries. Such means are contained within recesses 36, 38, 40, 42 at, respectively, each upper edge 14, 16, 18, 20. Each of the recesses 36 to 42 is open to the top surface 22 and to a respective side surface 24, 26, 28 or 30 of the base 11. The means for mounting include a rest or seat 44 (best seen in recess 36), raised above a bottom surface 45 or floor of each recess 36 to 42 for supporting an AA sized battery at its side adjacent an end face of the battery that includes the positive terminal. The means for mounting furthermore includes another generally semi-circular seat 46 (best seen in recess 38) for locating and supporting an AA size (or MA size) battery at its side adjacent an end face of the battery that includes the negative terminal. A contact 50 is located adjacent rest 44 by a wall 52 of each recess and an opposite contact 47 is located adjacent the seat 46 of each recess for an AA sized battery to be located therebetween. The contact 47 is shaped to have a convexly curved portion 48 directed towards the contact 50 to provide a spring bias on the battery facing end (that is, on the negative terminal end of the battery). This curved portion 48 of contact 47 urges the battery towards the other contact 50. Thus each recess 36 to 42 contains oppositely located contacts 47 and 50 between which a rechargeable AA sized battery is locatable, resting upon rest 44 and seat 46. The rest 44 in each recess 36 to 42 extends towards the contact 47–48 a short distance to a substantially vertical wall 54 (best seen in recess 36) which extends to the bottom surface 45 of each recess 36 to 42. Wall 54 locates another contact 56 for the positive terminal of a AAA sized battery, wherein the negative end of the battery also contacts the contact 47–48, which biases the AAA sized battery towards the contact 56, the AAA sized battery for charging lying at an angle within a recess resting on the seat 46 and the bottom surface 45 of each recess 36 to 42. FIG. 2 illustrates an AA sized battery 57 located for charging in recesses 38 and 42 and a AM sized battery 59 located for charging in recesses 36 and 40. The batteries 59 are located at an angle due to the different heights of seat 46 near contact 47–48 and floor surface 45 near contact 56. Thus each recess 36 to 42 of the battery charger 10 is formed to accommodate either an AA or an AAA sized battery for charging.

Figure 3:
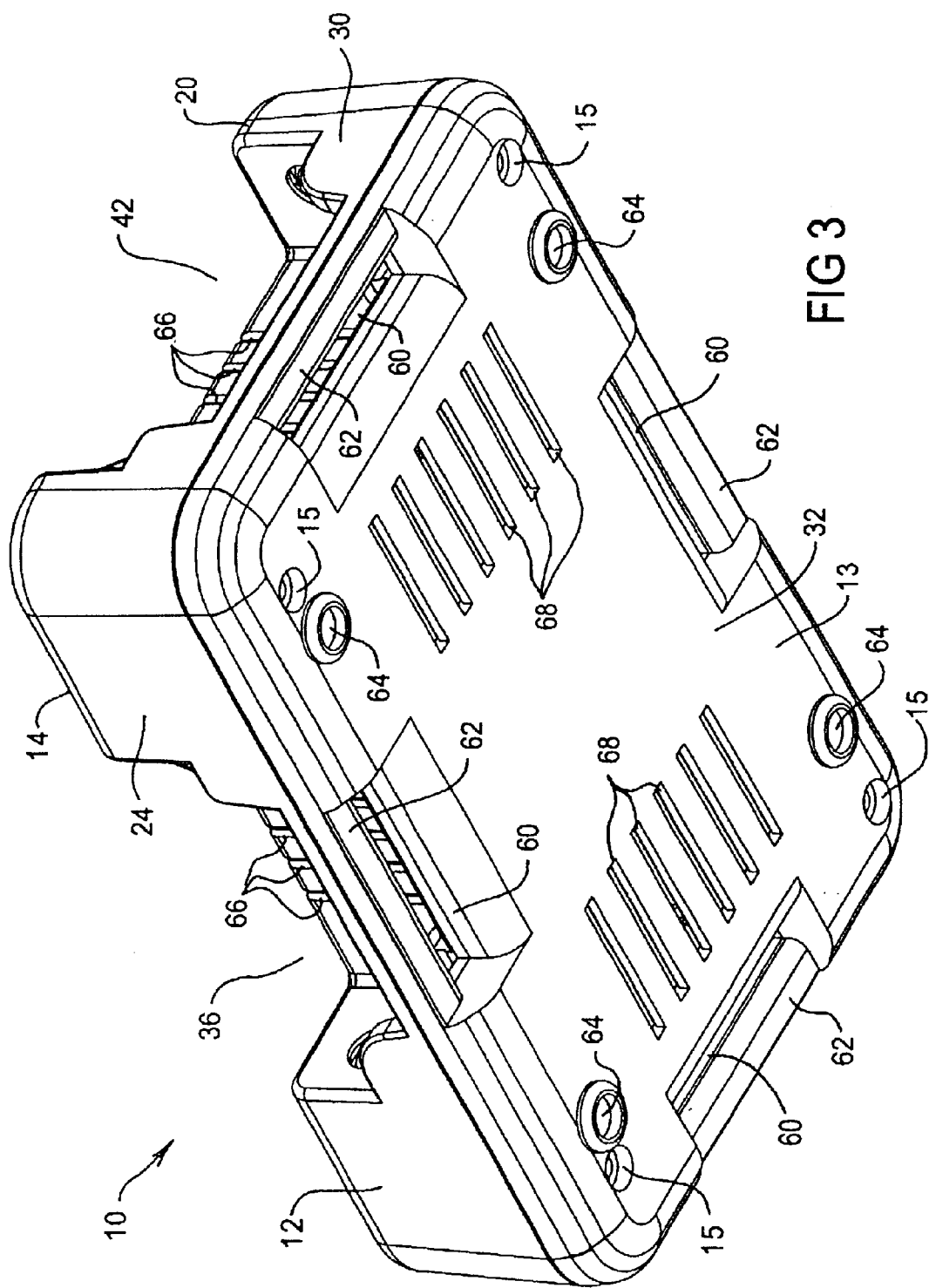
FIG. 3 is an underneath view of the charger of FIG. 1.

The base 11 of charger 10 furthermore includes a number of slots 60, each of which extends from the bottom surface 45 of a respective recess 36 to 42 through to the bottom surface 32 of the base 11 and preferably also opens to the adjacent side surface 24, 26, 28 or 30 of the base 11 as indicated by references 62 (best seen in FIG. 3). The base 11 also includes four pads 64 on its bottom surface 32 generally near the corners of such surface such that when placed on a bench top for example, the bottom surface 32 of base 11 will be spaced away a small distance from such bench top. This spacing allows for improved ambient air circulation through the slots 60 thus further exposing the AA or AAA sized batteries contained in the recesses 36 to 42 for cooling. The top part 12 of base 11 is formed with vertically extending channels 66 along a rear wall of each of the recesses 36, 38, 40 and 42 which further assist convective air flow and thus cooling of the batteries 57 and 59. The bottom plate 13 of base 11 also includes slots 68 passing therethrough for circulation of ambient air through the interior of base 11 for cooling the charging circuit.

As is known, the charger 10 also includes a small lamp 70, which is for example green, to indicate that power to the charger 10 is on, and a small lamp 72 for each charging position, which are for example red, to indicate that a battery is being charged, which lamps 72 may be arranged to blink or be off when the associated battery has reached full charge. Also, given charging circuits for such chargers are well known by persons skilled in this field, further detailed description of the charging circuit 34 is unnecessary apart from noting that it may be a constant current charging circuit providing four series connected charging stations for simultaneously charging four batteries. It may also include monitoring and control circuitry for isolating one or more of the batteries when they become fully charged whilst the others continue to be charged. Clearly the lamps 72 would be operated by such monitoring and control circuitry.

Figure 4:
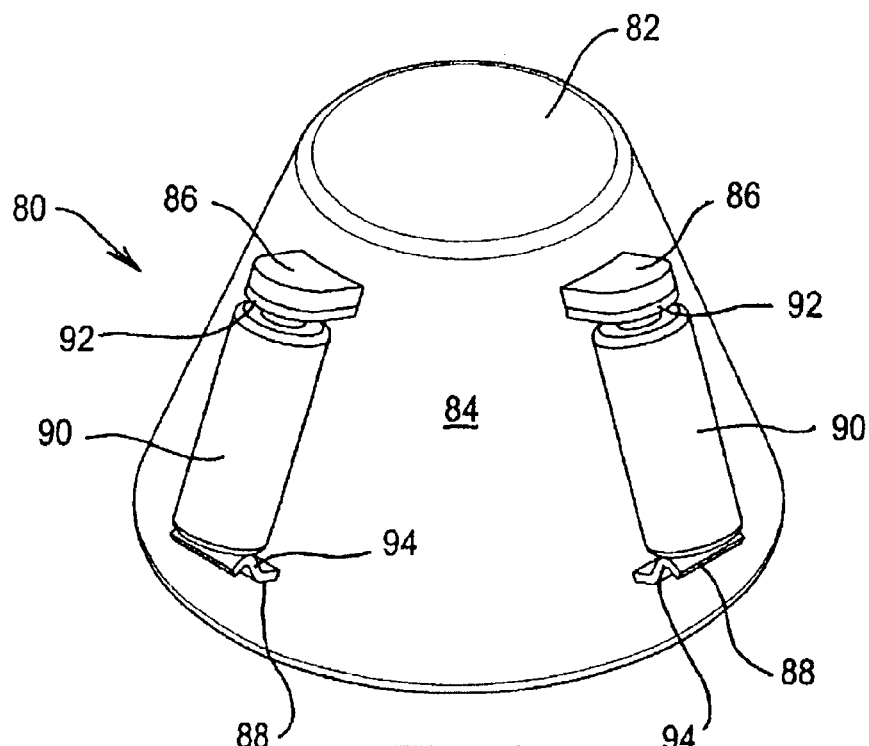
FIG. 4 schematically illustrates another embodiment.

FIG. 4 schematically illustrates a charger 80 having a base 82 of frustoconical shape. Base 82 may be of two-part construction (not shown) similar to base 11 of charger 10 of FIGS. 1 to 3, thereby having a hollow interior for containing the charging circuitry (not shown). The curved outer surface 84 of base 82 includes means thereon in the form of brackets 86 and 88 arranged in pairs and between each pair of which a battery 90 for charging is removably locatable. The pairs of contacts 86 and 88 of which there may be, for example four pairs, are evenly spaced around the curved surface 84 and they are shaped so as to hold a battery 90 in position a small distance away from surface 84. Thus the batteries 90 are substantially exposed and spaced apart for cooling whilst being charged.

Each of the brackets 86 provides a rigid mount for an associated electrical contact 92. An opposite electrical contact for each battery is provided by the opposite bracket 88 as such of each pair. Each bracket/contact 88 may be a metal strip extending as a cantilever from the curved surface 84, thereby providing a spring structure, and having a curved portion 94 for contacting the negative terminal end of a battery 90. Thus each bracket/contact 88 biases an associated battery 90 towards the opposite contact 92/86 structure. As is known, the contacts 88 and 92 are associated with the charging circuit within base 82 for a charging current to be passed through a battery 90 located therebetween.

The charger 80 will include means (not shown) as known for supplying power to its charging circuit from a suitable power supply and may include other features, such as slots (not shown) for passage of air through the base 82 for cooling the charging circuit, or indicator lamps as for the charger 10 of FIGS. 1 to 3, as are also known. Furthermore the means for individually mounting the batteries 90 may take various forms. For example, annular ledges around curved surface 84 may be provided which locate and support appropriately positioned contacts. Although charger 80 as illustrated is for accommodating batteries of one size, for example AA or AAA, it may be structured to accommodate both sizes of battery. This may be provided for example by each contact 88 being carried by a slide having two indent positions, whereby the contacts 92 and 88 may be spaced to accommodate an AA sized battery or may be more closely spaced (by sliding contact 88 on its slide towards contact 92) to accommodate an AAA sized battery.

Figure 5:
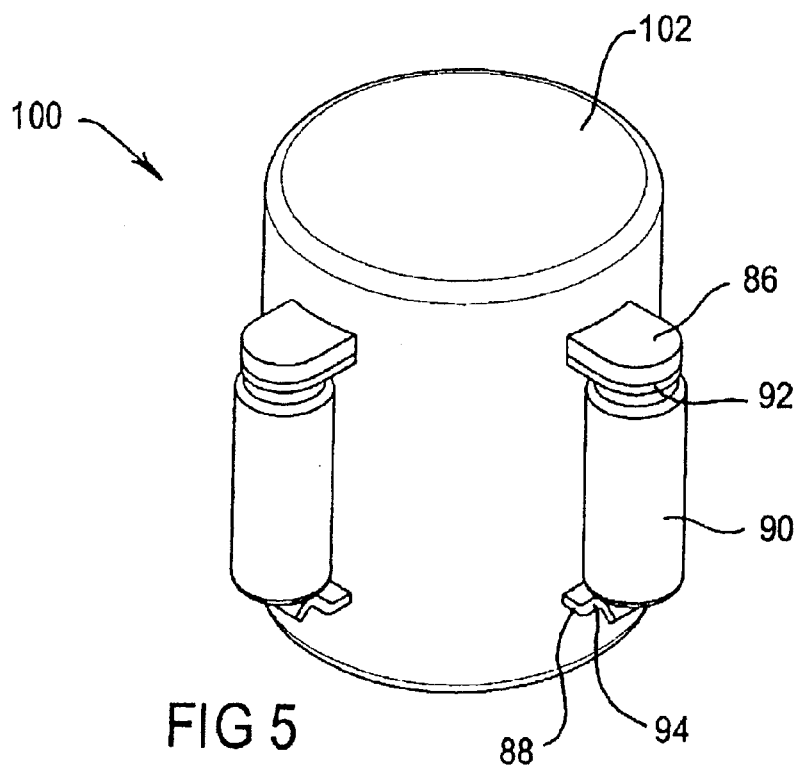
FIG. 5 schematically illustrates a third embodiment.

FIG. 5 schematically illustrates a further embodiment of a charger 100 according to the invention having a base 102 of cylindrical shape. Otherwise the charger 100 is similar to the charger 80 of FIG. 4 and thus corresponding componentry has been correspondingly referenced.

For a battery having a rated capacity of 1800 mAh (milliamp hours) which means it takes one hour to fully charge or discharge the battery at a current of 1800 milliamps, 30 minute charging requires a charging current of 3.6 amps. For a battery of rated capacity 2100 mAH (currently the maximum rating for AA type NiMH batteries) 30 minute charging requires a charging current of 4.2 amps. Experiments have shown that it is possible with an embodiment of the present invention as in FIGS. 1–3 to charge such batteries to rated capacity within 30 minutes without damaging the batteries. For example, for 1800 mAh NiMH rechargeable batteries, according to these experiments, the average temperature rise under a charging current of 3.6 amps is reduced by about 5 to 10° C. when compared with a prior art charger. The design of a charger as in FIGS. 1 to 3 also provides the advantage of easy installation and removal of the batteries from the charger.

The experimental results were as follows:

| Conditions - Batteries AA size 1800 mAh (NiMH type) Charging current: 3.6 A Charging time: 30 mins Charger size: 120 × 80 × 34 mm Ambient temp: 25° C. | | | | |
| --- | --- | --- | --- | --- |
| Prior Art Layout of batteries (i.e. side by side) | | | | |
| Battery No. | A | B | C | D |
| Battery Temp ° C. | 68 | 72 | 72 | 68 |
| Layout of batteries as in FIG. 1 | | | | |
| Battery No. | A | B | C | D |
| Battery Temp ° C. | 62 | 62 | 62 | 62 |

Each of the battery temperatures shown in the above tables is the average of the temperatures taken on a number of test batteries after each has been charged for 30 minutes.

The invention described herein is susceptible to variations, modifications and/or additions other than those specifically described and it is to be understood that the invention includes all such variations, modifications and/or additions which fall within the scope of the following claims.

What is claimed is:

1. A battery charger for simultaneously charging a plurality of rechargeable batteries, each battery having a reference test current $I_t$ amperes as defined in paragraph 2 of IEC Standard 61434:1996, that is $$I_t A = \frac{C_n A h}{1h}$$

where $I_t$ is the reference test current, in amperes (A);

$C_n$ is the rated capacity of the cell or battery as declared by the manufacturer, in ampere-hours (Ah);

n is the time base (hours) for which the rated capacity is declared, the charger comprising a base, a charging circuit contained within the base and connectable to a power supply, the base including means for individually mounting thereon a plurality of rechargeable batteries, the mounting means for each battery including contacts connected to the charging circuit for contacting the terminals of the battery for passage of a charging current through the battery, wherein the mounting means for each battery are located relative to the base and to each other such that a plurality of batteries mounted on the base are substantially exposed and spaced apart whereby the plurality of batteries are chargeable without over-heating with an average charging current greater than 1.0 $I_t$ and up to about 2.0 $I_t$.

2. The battery charger as claimed in claim 1 wherein the base is generally a rectangular parallelepiped having four upper edges, wherein the mounting means for each battery locates a battery generally along each edge.

3. The battery charger as claimed in claim 2 wherein the mounting means for each battery is provided within a recess at each upper edge, each recess being open to a side surface and a top surface of the base whereby a battery therein is exposed at said side and top surfaces for cooling.

4. The battery charger as claimed in claim 3 wherein each recess includes a rest for supporting a battery, each rest located between a pair of contacts between which a battery is insertable for charging, the contacts arranged to removably retain the battery within a recess on the rest.

5. The battery charger as claimed in claim 4 wherein each recess includes a slot extending from the recess bottom to a bottom surface of the base for further exposing a battery for cooling.

6. The battery charger as claimed in claim 5 wherein each slot also opens to a side surface of the base.

7. The battery charger as claimed in claim 6 wherein each recess and the mounting means for a battery in each recess and the associated contacts are arranged for the recess to accommodate either an AA or an AAA sized battery.

8. The battery charger as claimed in claim 7 wherein each recess includes a negative contact for contacting the negative of either an AA or an AAA sized battery and a proximate rest for supporting the battery, the recess further including a positive contact for contacting the positive of an AA sized battery and another positive contact for contacting the positive of an AAA sized battery, and respective rests proximate each positive contact for supporting a respective battery, whereby an AA sized battery is locatable between the negative contact and one of the positive contacts and alternatively an AAA sized battery is locatable between the negative contact and the other positive contact.

9. The battery charger as claimed in claim 1 wherein the base is generally cylindrical or frustoconical having a curved outer surface, wherein the mounting means for each battery includes contacts extending from the curved outer surface for a battery to be inserted therebetween in an upright orientation.

10. The battery charger as claimed in claim 9 wherein each pair of contacts for retaining a battery hold the battery spaced from the curved outer surface for increased exposure of the battery for cooling.

11. The battery charger as claimed in claim 1 wherein the mounting means for each battery are arranged to accommodate either an AA or an AAA sized battery.

12. A battery charger for simultaneously charging a plurality of rechargeable batteries, each battery having a nominal charging current as determined by its capacity rating in milliamp hours at one hour, the charger comprising a base generally of parallelepiped shape having a top surface and four side surfaces, a charging circuit contained within the base and connectable to a power supply, the base including four recesses in its top surface, each recess adjacent a side surface and open to that surface, oppositely located contacts within each recess and between which a battery is positionable, wherein the contacts are connected to the charging circuit for passage of a charging current through the battery, wherein a battery positioned in a recess between the contacts is substantially exposed at the top surface and a side surface of the base whereby four batteries positioned in the recesses are chargeable without over-heating with an average charging current of up to about twice their nominal charging current.

13. A battery charger for simultaneously charging a plurality of rechargeable batteries, each battery having a nominal charging current as determined by its capacity rating in milliamp hours at one hour, the charger comprising a base, a charging circuit contained within the base and connectable to a power supply, the base including means for individually mounting thereon a plurality of rechargeable batteries, the mounting means for each battery including contacts connected to the charging circuit for contacting the terminals of the battery for passage of a charging current through the battery, wherein the mounting means for each battery are located relative to the base and to each other such that a plurality of batteries mounted on the base are substantially exposed and spaced apart whereby the plurality of batteries are chargeable without over-heating with an average charging current of up to about twice their nominal charging current.

* * * * *